Feb. 7, 1950 — W. E. WHALEY — 2,496,763
DISPLAY CARD HOLDER FOR AUTOMOBILES
Filed Oct. 23, 1946 — 2 Sheets-Sheet 1

WILLIAM E. WHALEY
Inventor
By James N. Grave
Attorney

Feb. 7, 1950 — W. E. WHALEY — 2,496,763
DISPLAY CARD HOLDER FOR AUTOMOBILES
Filed Oct. 23, 1946 — 2 Sheets-Sheet 2

Inventor
WILLIAM E. WHALEY

Patented Feb. 7, 1950

2,496,763

UNITED STATES PATENT OFFICE 2,496,763

DISPLAY CARD HOLDER FOR AUTOMOBILES

William E. Whaley, Louisville, Ky.

Application October 23, 1946, Serial No. 705,134

1 Claim. (Cl. 40—129)

My invention relates to improvements in mobile signs, and has to do, more particularly, with the provision of a display-card holder adapted for direct attachment to a body panel of an automobile of the passenger type.

The sales-effectiveness of taxicab poster advertising has resulted in widespread adoption of this medium of advertising. For the most part, the posters heretofore in use upon taxicabs have been structurally incorporated with, or supported by, a member which serves as a cover for the spare tire of the vehicle. During the past several years, however, the mounting of spare tires upon the exterior of passenger vehicles has become obsolete and, accordingly, this instrumentality has become unavailable as a poster support.

Advertising posters of a type most suitable for taxicab use consist of a stiff paperboard card lithographed in a plurality of contrasting colors. While quite resistant to moisture by reason of their calendered and lithographed nature, such cards have limitations in respect to edge wetting and buckling stresses caused by variant air pressures induced by vehicle travel. Installation cost, reduction of vehicle body damage to a minimum, resistance to destruction by minor traffic accidents and road vibrations, lightness in weight, facile card replaceability, silence and freedom from rattles, adaptability to body panels of various sizes and curvatures, and adjustability to assure maximum visibility without card glare or shadow are factors which must be successfully dealt with to attain practicability in a device of this general nature.

The present invention, as embodied in the structural form hereinafter disclosed, has, as its desideratum, the solution of the foregoing problems in mobile signs of this general type and is characterised by the attainment of certain well-defined objects. It is a primary object of my invention to provide a post-card holder of the class described which, made in a single standard size and form, is inherently adaptable for securement to, and support upon, any of the vast number of sizes and shapes of conventional automobile bodies of the passenger type.

It is also a salient object of my invention to provide a post-card holder for taxicab use which, though light in weight, is durable even under the severe conditions of road vibration and abuse encountered in vehicles operated for hire.

It is an object of my invention, also, to provide a poster-card holder of the class set forth which is protective of the card, serving to shield the edges thereof from much if not all of the moisture incident to outdoor exposure.

It is an object of my invention to provide a poster-card holder of the class described which, though closely fitted to the supporting vehicle body panel, permits of facile card replacement.

Further objects, and objects relating to details and economies of construction and installation will more definitely appear from the description to follow. In one instance, I accomplish the objects of my invention by the means and methods set forth in the following specification. My invention is clearly defined by the appended claim. A structure constituting a preferred embodiment of my invention is illustrated in the accompanying drawings, in which:

Fig. 3 is a side view of the sign carrier and attached license plate holder mounted upon the door of the luggage compartment of an automobile as in Fig. 1;

Fig. 4 is a horizontal sectional view of the same carrier and the body panel to which it is mounted, showing details of its mode of attachment;

Fig. 5 is a detail sectional view, on an enlarged scale of the gate of the carrier and by reason of the hinged character of which the removal and replacement of posters is facilitated;

Fig. 6 is a vertical sectional view, on an enlarged scale, taken on line 6—6 of Fig. 1 and showing details of one mode of mounting the carrier on the door panel;

Fig. 7 is a vertical sectional view, also on an enlarged scale, showing an alternative mode of mounting the carrier on a door panel; and Fig. 8 is a vertical sectional view taken on line 8—8 of Fig. 2 and showing drainage slots.

Throughout the several views, the same reference numerals refer to the same parts.

Figure 1:
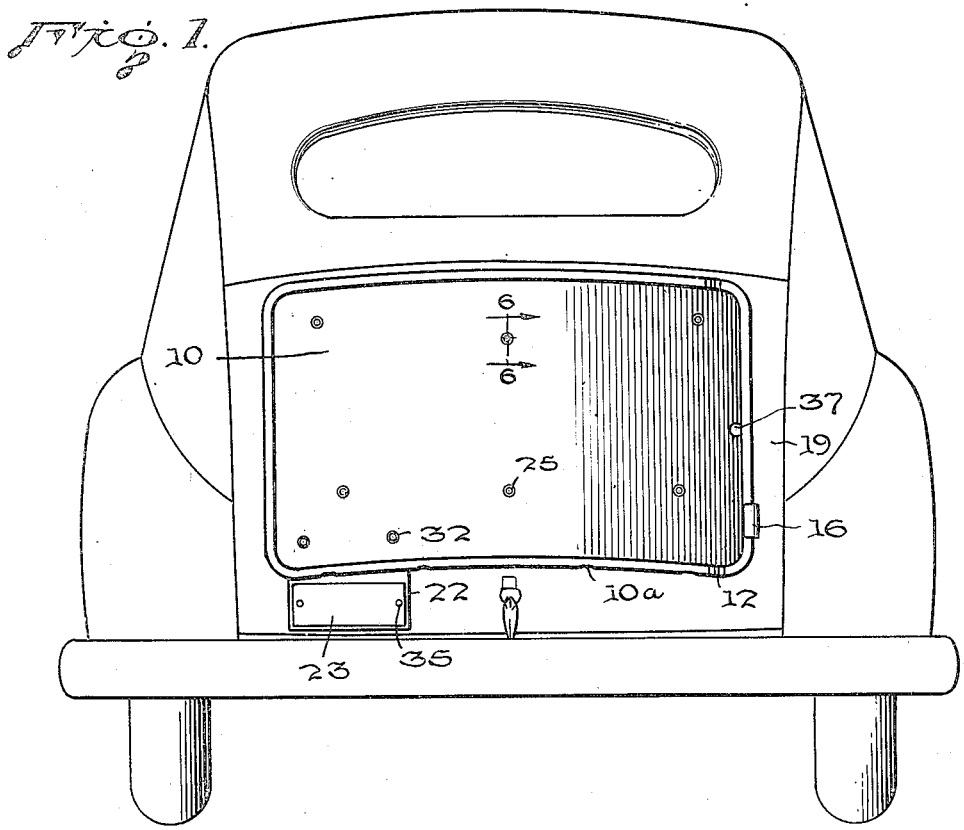
Fig. 1 is a rear elevational view of the lower rear portion of an automobile, the body of which is provided with a built-in luggage compartment upon the door of which luggage compartment is mounted a sign carrier and attached license plate holder constituting one preferred embodiment of my invention.
Figure 2:
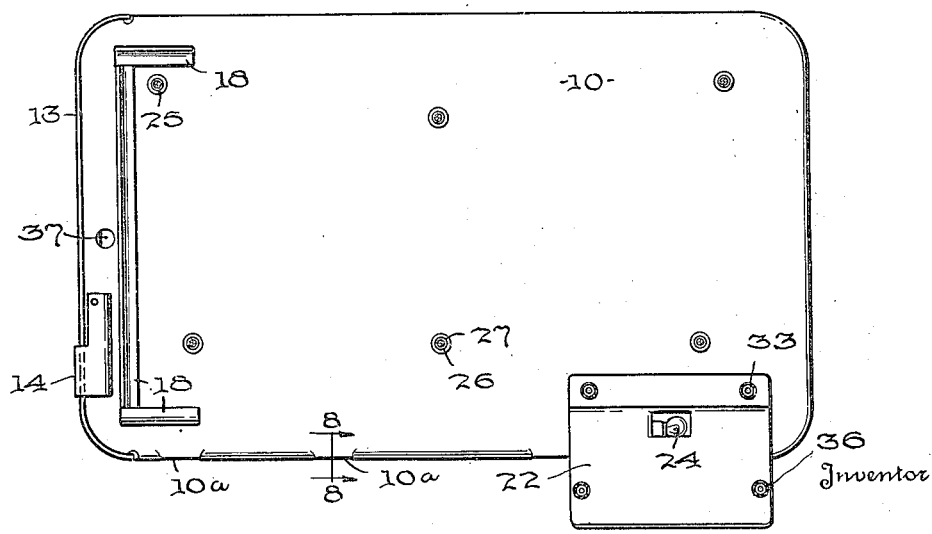
Fig. 2 is a rear elevational view of the sign carrier and license plate holder detached from the automobile body panel but having the attaching means in place.

In a broad sense, the several concepts of my invention may be said to find embodiment in a poster-card holder for automotive vehicles which consists of a generally rectangular panel having its periphery turned in, as by stamping, to form an integral annular frame of channel cross-section adapted snugly to receive a narrow marginal portion of the paperboard display card, and provided with a breakout outboard section through the opening of which card replacement is possible. Mounting means, in accordance with the invention are widely adjustable in an inboard-outboard direction with respect to the plane of the card holder, whereby the frame may be employed upon body panels having various curvatures relative to the general plane of mounting for the frame, and whereby the frame and its supported card may be inclined, with respect to the vertical, to insure good visibility without the creation of glare or shadow effects in the card. While the snugness of assembly of card and frame prevents, to a large extent, access of precipitated moisture to the card edges, means are provided, in my frame construction, for protecting the bottom edge of the card against such moisture as may tend to accumulate in the frame.

Referring to the construction illustrated in the accompanying drawings, my invention preferably, though not exclusively, finds structural embodiment in a substantially rectangular, slightly curved panel 10 whose peripheries are turned in upon themselves, as at 11, by a stamping or like operation, to form an annular frame of channel cross-section integral with the panel 10. One end of the panel and integral frame is provided with a break-out portion hinged as at 12 to provide a gate 13. Latching means are provided for the gate 13 consisting of a lever member 14 hinged on the panel 10 as at 15. This latching means is provided, as shown more particularly in Fig. 5, with a turned in gate engaging portion 16 and a hand or finger gripping portion 17.

The rear of the panel 10 is provided with bracing means consisting conveniently of small sections of angle iron 18 affixed to the panel 10 by means of welding, riveting or the like.

Poster-cards of the type intended for use in my holder are by dictate of commercial expediency of inexpensive paperboard construction. While the faces of such cards are quite weather-resistant due to the calendered character thereof and, in the case of the front face, to the lithographing thereon, the marginal edges thereof are relatively moisture-absorbent and cannot be readily and cheaply waterproofed by impregnation with a sealing compound. I have found that such a card, snugly marginally received in a frame of channel cross-section is adequately protected thereby along its top and side edges, but suffers injury along its bottom edge by reason of ingress of water which tends to accumulate in the lower portion of the frame. I have avoided this problem, in the disclosed frame construction, by drainage of the channel through a multiplicity of drainage slots 10a formed in the bight portion of the lower channel section. Even where the sign is substantially inclined with respect to the vertical, such moisture as accumulates in the lower channel section of the frame gravitates readily, and is drained through the slots.

Bodies of modern passenger automobiles vary widely in size and configuration and the panels which comprise these bodies are generally curved in several directions and are suitably reinforced by truss sections of pressed sheet metal suitably embossed and skeletonized to afford maximum panel strength with minimum weight. Particularly is this so in the case of automobiles having a built-in luggage compartment provided, as are illustrated, with a rear panel 19 which is hinged to the body and constitutes a luggage compartment door. As best shown in Fig. 4, the disclosed panel 19 is conventionally reinforced by a compressed metal member 20 having bent portions 20a contacting panel 20 at spaced points along its inner surface to lend requisite rigidity thereto. As is generally the case, this pressed metal reinforcing member is skeletonized as at 21.

My poster-card carrier is especially well suited for mounting upon reinforced body panels of this general type, although not limited thereto, and is inherently adaptable to a wide range of structure, shape and size therein, as will appear.

The poster-card holder is provided, furthermore, in accordance with the invention, with a novel license plate holder 22 which is conveniently attached to the lower left hand corner of the card holder. This license plate holder is preferably made up of a single sheet of metal bent or creased, as clearly shown in Fig. 3, in such a manner as to provide for a vertical mounting of the license plate 23. By virtue of bending or creasing, the plate holder is thus adjustable to assure vertical mounting of the plate regardless of the angle of the mounted panel 10. Immediately above the license plate 23 and protected by the lower portion of the panel 10, plate illuminating means 24 are provided and attached to the license plate holder. Convenient wiring is also provided, but not shown in the drawing.

The mode of application and the novel function features of the above described construction should be readily apparent. Assuming as illustrated, that the device is to be installed upon a reinforced body panel of the type shown generally in Fig. 4, the optimum locations for perforations on the rear automobile panel 19 are first determined and then the perforations are drilled into the panel. Then corresponding perforations are drilled into the panel 10 of the poster-card holder. Assuming that the perforations in the panel 19 have been drilled to overlie skeletonized portions 21 of the reinforcing member 20, the assembling operation is as follows, reference being had particularly to Figs. 4 and 6 of the drawing: A carriage bolt 25 is inserted through a perforation previously drilled in panel 10 and a fender washer 26 applied over the shank of the bolt adjacent the panel 10. Then a spacer 27 and fender washer 28 are applied as shown. The panel 10 is then mounted upon panel 19 and bolt 25 passed through a corresponding perforation in panel 19. Then fender washer 29, lock washer 30 and nut 31 are applied as shown.

A wide degree of adjustment with respect to inboard-outboard direction may be accomplished through the use of various length spacers. This is a salient feature of my invention.

In the event that reinforcing section 20 is not skeletonized at convenient points, it may be necessary to employ a longer bolt 25a which will pass through both the panel 19 and the reinforcing member 20. Assembly for such a structure is shown in Fig. 7.

Mounting of the license plate holder is, of course, quite a simple operation The license plate holder is merely attached through means of bolts 32 and corresponding nuts 33 while the license plate itself is later affixed to the holder through means of bolts 35 and corresponding nuts 36.

The mode of installation of the card A within the frame is extremely simple. The portion 17 of the latching means is pulled in a lateral direction and then the gate 13 is swung outwardly. The card A may then be inserted into the card holder by a simple lateral sliding action. After insertion of the card the gate 13 is closed and maintained upon the front surface of the card by the locking means. In removing the card it is desirable to first obtain a firm grip upon the card by first inserting a finger through the hole 37 to dislodge the card in the event that it may have become stuck, so to speak, in the channel sections.

I am aware that my invention is susceptible of embodiment in various structural forms and that those skilled in the art, upon familiarization with the basic concepts herein disclosed, may, for purposes of structural simplicity or cheapening the cost of manufacture, find it expedient to make various structural changes therein. I, therefore, claim as my invention broadly as indicated by the appended claim.

I claim:

A poster-card holder for automotive vehicles, comprising a relatively rigid, slightly curved, generally rectangular panel member having its periphery turned in to form an integral annular frame of channel cross-section adapted snugly to receive a narrow marginal portion of a paperboard display card, one end of said panel member being provided with a break-out outboard gate section made up of an outboard flange of channel section and partial portions of the outboard flanges of two adjacent channel sections which latter are respectively hinged to the panel member along a common axis, said gate section being swingable outwardly from said panel member, means for securing said swingable gate section in closed position consisting of a locking lever pivoted to said panel member and provided with a turned-in finger gripping portion and an opposed, integral, turned-in gate engaging portion, both portions being of the same configuration reinforcing angle iron members mounted on the inboard panel surface and partially overlying that part of the panel surface opposite said gate section, an aperture in said panel section lying between said reinforcing members and the adjacent channel section for facilitating removal of a card from the channel sections, means for mounting the poster-card holder to a panel of an automobile luggage compartment consisting of a plurality of bolt and variable spacer means, to provide adjustable positioning of the panel member to accommodate various curvatures of luggage compartments, license plate holder mounted on one of the lower corners of said panel member, and license plate illuminating means mounted near the top of said license plate holder and, when in position assembled with said panel member, being protected and hidden from normal view by the overhanging edge of said panel member.

WM. E. WHALEY.

REFERENCES CITED

The following references are of record in the file of this patent:

UNITED STATES PATENTS

| Number | Name | Date |
| --- | --- | --- |
| 1,023,471 | Hoffman | Apr. 16, 1912 |
| 1,516,563 | Campbell | Nov. 25, 1924 |
| 1,852,375 | Read | Apr. 5, 1932 |
| 1,903,941 | Rasbridge | Apr. 18, 1933 |
| 2,102,987 | Acy | Dec. 21, 1937 |
| 2,301,834 | Whaley | Nov. 10, 1942 |

FOREIGN PATENTS

| Number | Country | Date |
| --- | --- | --- |
| 402,911 | Great Britain | Dec. 14, 1933 |